(12) United States Patent
van Kempen et al.

(10) Patent No.: US 8,541,043 B2
(45) Date of Patent: Sep. 24, 2013

(54) FAT CONTAINING EDIBLE EMULSIONS WITH IRON AND ZINC

(75) Inventors: Gijsbert Michiel Peter van Kempen, Vlaardingen (NL); Krassimir Petkov Velikov, Vlaardingen (NL); Robert Marinus Verseput, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 821 days.

(21) Appl. No.: 12/486,911

(22) Filed: Jun. 18, 2009

(65) Prior Publication Data

US 2009/0317517 A1 Dec. 24, 2009

(30) Foreign Application Priority Data

Jun. 19, 2008 (EP) .................................... 08158543

(51) Int. Cl.
*A23D 7/005* (2006.01)
*A23L 1/304* (2006.01)

(52) U.S. Cl.
USPC ............................................. 426/602; 426/74

(58) Field of Classification Search
USPC ...................................... 426/72–74, 601–604
See application file for complete search history.

(56) References Cited

U.S. PATENT DOCUMENTS

| | | | |
|---|---|---|---|
| 2,310,383 A | | 2/1943 | Andrews |
| 3,823,127 A | | 7/1974 | Jones et al. |
| 4,216,236 A | * | 8/1980 | Mueller et al. ................... 426/72 |
| 4,526,793 A | * | 7/1985 | Ingenbleek et al. ............ 426/72 |
| 4,703,060 A | | 10/1987 | Traitler et al. |
| 4,938,984 A | | 7/1990 | Traitler et al. |
| 4,963,385 A | | 10/1990 | Antrim et al. |
| 4,970,235 A | | 11/1990 | Traitler et al. |
| 5,011,855 A | | 4/1991 | Traitler et al. |
| 5,244,681 A | * | 9/1993 | Vinci et al. ....................... 426/72 |
| 6,254,905 B1 | | 7/2001 | Hojo |
| 6,472,003 B2 | * | 10/2002 | Barrett-Reis et al. ........... 426/72 |
| 6,475,539 B1 | * | 11/2002 | DeWille et al. ................. 426/72 |
| 6,521,247 B1 | | 2/2003 | deVries |
| 6,645,543 B2 | * | 11/2003 | Gohman et al. ............... 426/601 |
| 8,043,648 B2 | * | 10/2011 | Edelman et al. ............... 426/602 |
| 2006/0233915 A1 | * | 10/2006 | Puski et al. ....................... 426/72 |
| 2008/0254193 A1 | * | 10/2008 | Edelman et al. ............... 426/602 |

FOREIGN PATENT DOCUMENTS

| | | |
|---|---|---|
| DE | 238720 A1 | 3/1986 |
| DE | 238720 * | 9/1986 |
| EP | 1166653 A2 | 1/2002 |
| EP | 1510140 | 3/2005 |
| JP | 10262555 | 10/1998 |
| WO | WO9814072 | 4/1998 |
| WO | WO03032741 A1 | 4/2003 |
| WO | WO 03/059358 | 7/2003 |
| WO | WO2006112998 A1 | 10/2006 |
| WO | WO2007121807 A1 | 11/2007 |

OTHER PUBLICATIONS

Stecher, P. 1968. The Merck Index. Merck & Co., Inc., 8th edition., Rahway, NJ. p. 453.*
European Search Report Application No. EP 08158543 dated Aug. 11, 2008.
Patent Abstracts of Japan , JP 10262555, Oct. 1998, XP002491775.
Anonymous, "Ferrous Glycinate (Processed with Citric Acid)", [Online] 2004, pp. 1-5, XP002491772.
Database Biosis [Online], Biosciences Information Service, Philadelphia, PA, US; Aug. 2005, Zhang Hong et al: "Storage stability study of margarines produced from enzymatically interesterified fats compared to margarines produced by conventional methods. I. Physical properties", European Journal of Lipid Science and Technology, vol. 107, No. 7-8, Aug. 2005, pp. 530-539, XP002491773.
Database FSTA [Online], International Food Information Service, Frankfurt-Main, DE; 1979, Shmidt et al., "Effect of emulsification conditions and cooling on structural and rheological properties of margarine", XP002491774.
Patent Abstracts of Japan, JP 06245698, Sep. 1994, XP002491776.
Goudappel et al., "Measurement of Oil Droplet Size Distributions in Food Oil/Water Emulsions by Time Domain Pulsed Field Gradient NMR", Journal of Colloid and Interface Science, 239, pp. 535-542 (2001).
Alderliesten, "Mean Particle Diameters. Part I: Evaluation of Definition Systems", Part. Part. Syst. Charact. 7 (1990), 233-241.
Alderliesten, "Mean Particle Diameters Part II: Standardization of Nomenclature", Part. Part. Syst. Charact, 8 (1991), 237-241.
Co-pending U.S. Appl. No. 11/988,771, filed Jan. 14, 2008.
Shmidt, Effect of emulsification conditions and cooling on structural and rheological properties of margarine, Database FSTA (online), International Food Information Service, 1978, 1 page.
Polylactic Acid, Primary Information Services, Mar. 1, 2011, pp. 1-6, India.
Hurrell, Preventing Iron Deficiency Through Food Fortification, Nutrition Reviews, Jun. 1997, vol. 55, No. 6, pp. 210-222.
Third Party Observations to the European Patent Office for EP Publication EP 2299837 dated Jun. 21, 2011.
Co-pending application Marshman et al., U.S. Appl. No. 11/988,771, filed Jan. 14, 2008.

* cited by examiner

*Primary Examiner* — Carolyn Paden
(74) *Attorney, Agent, or Firm* — Gerard J. McGowan, Jr.

(57) ABSTRACT

Edible emulsion comprising 5 to 85 wt % fat and between 0.003 wt % and 0.7 wt % of iron and between 0.002 wt % and 0.3 wt % of zinc.

10 Claims, No Drawings

FAT CONTAINING EDIBLE EMULSIONS WITH IRON AND ZINC

FIELD OF THE INVENTION

The invention relates to a containing edible emulsion comprising iron and zinc.

BACKGROUND TO THE INVENTION

Fat containing edible emulsions such as margarine have a relatively long shelf-life, e.g. often 1-3 months. During use of the edible emulsion the emulsion gets exposed to the air by opening of the tub and gets temperature cycled by taking it out of the refrigerator regularly and then back into the refrigerator again. Because of the long shelf-life the edible emulsion gets often exposed to the air and different temperatures and several processes happen. One of these is the yellowing of the fat containing emulsion. In the beginning the fat containing emulsion is white, or may be a very pale yellow, however over time and during use the emulsion becomes more and more yellow. This yellow colouring is seen by consumers as reduced freshness and the emulsion is perceived as old.

It is therefore an object of the current invention to provide a fat containing emulsion that has less yellowing over time. Another object of the invention is to provide a fat containing emulsion that is perceived as fresh even after a storage and use time of several weeks. Further a fat containing emulsion with good organoleptic properties are envisioned with the current invention. Another object is to provide a fat containing emulsion providing minerals and fatty acids that are healthy.

SUMMARY OF THE INVENTION

One or more of the above objects are attained by an edible emulsion comprising 5 to 85 wt % of fat and between 0.002 wt % and 0.3 wt % of zinc and between 0.003 wt % and 0.7 wt % of iron.

It was surprisingly found that emulsions with iron and zinc have less yellowing after some time.

DETAILED DESCRIPTION OF THE INVENTION

The present invention relates an edible emulsion containing fat.

The emulsion according to the invention comprises from 5 to 85 wt % of a fat, preferably from 10 to 70 wt % more preferably from 20 to 60 wt %, most preferably from 30 to 40 wt % fat. The fat consists predominantly of triglycerides. The fat can be a single fat or a combination of fats.

The fat or fat blend may comprise vegetable or animal fats which may be hydrogenated, interesterified or fractionated and combinations thereof. Suitable animal fats may consist of butterfat or tallow. Suitable vegetable fats can for example be selected from the group comprising bean oil, sunflower oil, palm kernel oil, coconut oil, palm oil, rapeseed oil, cotton seed oil, maize oil, or their fractions, or a combination thereof. Interesterified fat blends of these fats or optionally with other fats are also encompassed in the invention.

The present invention is especially suitable for emulsion wherein the fat comprises poly unsaturated fatty acids (PUFA). PUFA are more susceptible to fat oxidation due to their unsaturation level. Preferred PUFA may be selected from the group comprising linoleic acid, linolenic acid, alpha linolenic acid (ALA) docosahexaenoic acid (DHA), docosapentaenoic acid (DPA), eicosapentaenoic acid (EPA), eicosatetraenoic acid, and stearidonic acid. Preferred PUFA are omega-6 or omega-3 fatty acids. Other preferred PUFA are long-chain PUFA (LC-PUFA). Most preferred PUFA are ALA, DHA and EPA.

In a preferred embodiment at least 20 wt % of the fat are PUFA, more preferred at least 30 wt % and even more preferred more than 40 wt % and most preferred more than 50 wt % of the fat is polyunsaturated.

Preferably at least 2 wt % of the fat of the edible emulsion of this invention are omega-3 fatty acids, more preferably at least 5 wt %, most preferably at least 10 wt %. In a preferred embodiment the edible emulsion of the invention comprises 2-40 wt %, even more preferred 5-30 wt %, and most preferred 7-20 wt % omega-3 fatty acids on fat.

Suitably at least 0.3 wt % of the fat of the edible emulsion of this invention are DHA and/or EPA fatty acids, more suitably more than 1 wt %, most suitably more than 2 wt %. Suitably the edible emulsion of the present invention comprises 0.5-25 wt % of EPA and/or DHA fatty acids on fat level, preferably 1-15 wt %, more preferably 2-10 wt % and most preferably 3-7 wt %.

Suitable embodiments according to the invention provide an emulsion wherein at least 30 mg of EPA and DHA is present in a daily serving size. More suitable at least 60, more suitable 100 mg, more suitable 150 mg and even at least 500 mg of EPA and/or DHA is present in a daily serving size. A most suitable embodiment provides an emulsion having 30 to 1500 mg, preferably 50-1000 mg, more preferably 150-500 mg, and most preferably 200-300 mg of DHA and/or EPA present in a daily serving size.

For fat containing emulsions a suitable daily serving size is 10 to 50 g emulsion per day, more preferably 15 to 40 g and most preferably 20 to 30 g per day.

Preferably the edible emulsion of the present invention has a good melting behaviour. Melting behaviour influences the organoleptic properties of an emulsion. If the emulsion doesn't melt fast enough a waxy mouthfeel becomes present and this is not appreciated by consumers.

In addition, suitably the edible emulsion of the present invention has overall a good taste impression, suitable for the product, despite the presence of mineral salt with an undesired flavour. The emulsion preferably has a good melting behaviour in the mouth and a creamy and/or dairy taste is appreciated.

The fat containing emulsion also comprises iron and zinc. For the purpose of the present invention the amounts are of the iron and zinc ion and not the salt or complex. The amount of iron source added will depend on the counter ion or complex and the hydration. For example 0.003 to 0.7 wt % of iron is present in the emulsion of the invention. If ferric pyrophosphate is used as iron source, then 0.012 to 2.8 wt % of ferric pyrophosphate is needed. Likewise for zinc, for 0.002 to 0.3 wt % of zinc, 0.0025 to 0.375 wt % of zinc oxide is needed.

Suitable iron sources are ferrous carbonate, ferrous citrate, ferrous ammonium citrate, ferrous gluconate, ferrous fumarate, ferric sodium diphosphate, ferrous lactate, ferrous sulphate, ferric diphosphate, ferric pyrophosphate, ferric saccharate, ferrous EDTA, elemental iron.

Suitable Zinc sources are zinc acetate, zinc chloride, zinc citrate, zinc gluconate, zinc lactate, zinc oxide, zinc carbonate, zinc sulphate.

In a preferred embodiment the amount of iron is from 0.02 wt % to 0.35 wt %, more preferably from 0.1 to 0.2 wt %.

In another preferred embodiment the amount of zinc is from 0.02 wt % to 0.15 wt %, more preferably from 0.05 to 0.1 wt %.

In a preferred embodiment the iron source is white or colourless. In another preferred embodiment the zinc source is white or colourless.

The emulsion of the invention may comprise thickeners. For stability reasons it may be useful to include thickeners in the emulsion, for example very low spreads, with 20 to 30 wt % of fat, often improve by addition of thickeners. Whether or not a thickener should be added and in what amount depends on factors as stability and application and may be determined by the skilled person.

Thickener may be any known thickener and are preferably selected from the group comprising gums, like xanthan, guar, and locust bean, carrageenan, polysaccharides, alginate, pectin, starch, modified starch and gelatine.

In preferred food products according to the invention, the aqueous phase comprises a native or a modified fully gelatinised starch which may be cook-up or pre-gelled, selected from any of the main starch groups: wheat, potato, rice, maize, waxy rice or waxy maize.

Examples of suitable starches include Remyrice™, Resistamyl™, Merigel™, Purity LFS™.

The amount of starch in the food product according to the invention depends somewhat on the type of chosen starch and is preferably from 0.2 to 5 wt %, more preferred from 0.7 to 3 wt %, most preferred from 1 to 2 wt %.

In a preferred embodiment the emulsion is fat continuous. In another preferred embodiment the emulsion is not a duplex emulsion. Even more preferred the emulsion is a single emulsion. A preferred embodiment of the present invention is a spread. Preferably the emulsion of the present invention is not chocolate or a chocolate containing emulsion.

To ensure homogeneous distribution of the aqueous phase in the continuous fat phase, the droplet size distribution $D_{3,3}$ of the dispersed aqueous phase is preferably less than 8 µm, more preferably from 4 to 8 µm, more preferred even lower than 4 µm. The method to determine $D_{3,3}$ is illustrated in the examples. It will be appreciated that the droplet size can be controlled by adjusting the processing conditions in the unit operations: e.g. higher rotational speed in a scraped surface heat exchanger will produce correspondingly smaller water droplet size distributions.

In addition, the edible emulsion according to the invention may comprise an emulsifier. The emulsifier is preferably a water-in-oil emulsifier. More preferably this emulsifier is selected from the group comprising distilled monoglycerides, citric acid esters of monoglycerides, di-acetyl acetic acid esters of monoglycerides, lactic acid esters of monoglyceride, monodiglycerides, polyglycerol polyricinoleate, polyglycerol esters of fatty acids or sorbitan esters of fatty acids.

The most preferred emulsifier is a distilled monoglyceride. Even more preferred are monoglycerides with unsaturated fatty acids or combinations of a monoglyceride comprising a saturated fatty acid residue and a monoglyceride comprising an unsaturated fatty acid residue.

The amount of emulsifier depends on the type and effectiveness of the emulsifier selected and can be determined by the person skilled in the art. Other factors influencing the amount of emulsifier that is required to obtain storage stable products are the amount of fat and the amount of thickener. As a general guidance the amount of emulsifier is preferably from 0.05 to 1.5 wt %, more preferred from 0.1 to 0.7 wt %, most preferred from 0.15 to 0.5 wt %.

The pH of the aqueous phase can be set to the desired value, among others to influence acidic or basic taste impression and to influence microbial stability. Preferably the pH of the aqueous phase in food products according to the invention is from 4.3 to 5.5.

Optionally some protein is added to the product according to the invention. Protein may be added to beneficially influence the taste, flavour and nutritional value of the food product and also may be added to increase browning of food stuff when the current composition is used as a medium for shallow frying.

Preferably the protein source is selected from the group comprising milk powders such as skim milk powder, butter milk powder, sodium caseinate, sour whey, denatured whey, or a combination thereof.

Preferably at least 0.3 wt % of protein is present in the emulsion, more preferably from 0.3 to 1 wt %.

In a preferred embodiment according to the emulsion no protein is present.

The emulsion according to the invention optionally contain other ingredients such as preservatives, vitamins, taste and flavour components, colorants such as beta-carotene, antioxidants.

The emulsion according to the invention can be prepared by any suitable process to prepare such products.

EXPERIMENTAL

D3,3 Value Measurements and E-Sigma

Samples were filled to a height of 15 mm in NMR tubes of 10 mm diameter, and thermally equilibrated for 30 min at 20° C. A restricted diffusion-based droplet size was obtained by means of pfg-NMR using a Bruker Minispec MQ20. The details of the technique are discussed by Goudappel et al (Journal of Colloid and Interface Science 239, (2001) 535-542). A measurement yields values for the volume weighted geometric mean diameter $d_{3,3}$ and the width of the droplet size distribution when plotted as a function of the logarithm of the diameter σ (E-sigma). Measurements were carried out in triplicate and results are expressed in terms of average $d_{3,3}$ values. Definitions of droplet sizes are given by Alderliesten (Particle and Particle Systems Characterization 7 (1990) 233-241, and ibid 8 (1991) 237-241).

Processing of Examples

In a vessel a mixture was prepared of the fat and fat-soluble ingredients at a temperature of about 60° C. In another, separate vessel a mixture was made water with water soluble ingredients which was heated to a temperature of 92° C. for 25 minutes. This mixture was cooled to 60° C. and subsequently mixed with the oil phase in a pre-mix tank at 60° C. as a water-continuous emulsion, followed by cooling and shearing in a series of A- and C-Units™ where the dimensions and energy requirements are suitable to deliver a fat-continuous end product and achieve a plastic structure which could be easily packed at around 10° C. in a suitable packaging material.

Example 1-2

Yellowness Measurement

Yellowness Measurements

Food product was stored in a plastic container at 25° C. for 9 weeks. After storage the yellowness was determined. The yellowness is measured with a Minolta CR300 Chroma Meter. The chroma meter is calibrated with a calibration tile (no 14033127). The product is measured and gives x, y and z values from which the yellowness index (Yi) can be calculated using the following formula:

$$Yi = 100 * (1.28 * x) - (1.06 * z)/y$$

Higher Yi reflects a more yellow color; lower Yi reflects a more white color.

Ingredients are listed in Table 1

TABLE 1

| (ingredients in wt %) | |
|---|---|
| Soybean oil | 27.2 |
| Hardstock fat | 11.8 |
| Mono-/diglycerides E471 | 0.3 |
| Vit. A palmitate | 0.0028 |
| Vit. D3 | 0.0003 |
| Vit. E acetate | 0.0188 |
| Flavor | 0.01 |
| Beta-carotene (colorant) | 0.0028 |
| Micronised ferric pyrophosphate | 0.084 |
| Zinc oxide | 0.014 |
| Potato starch (Perfectamyl) | 3.0 |
| Water | 57.2 |
| Salt | 0.6 |
| Sorbic acid | 0.07 |
| Citric acid | 0.004 |

Hardstock Fat:

Interesterified mixture of 70% dry fractionated palm oil, 10% palm oil, and 20% coconut fat.

The reference product is a product with ingredients as in Table 1 however without iron and zinc.

The yellowness is measured in a product with and without iron and zinc at 9 weeks of storage. The Yi values are averaged from duplo measurements (Table 2). The first and second trials are performed separately, however within each trial the product with iron and zinc and the reference product are treated similar.

TABLE 2

| | yellowness measurements | |
|---|---|---|
| | Reference product without Fe and Zn | Product with Fe and Zn |
| First trial | 92.0 | 80.8 |
| Second trial | 64.9 | 56.3 |

As can be seen for each trial the product with iron and zinc has a lower Yi value, indicating a less yellow color. Also the products with iron and zinc were perceived as fresher than the products without iron and zinc upon visual inspection.

Example 4 to 8

Yellowness Measurement

Yellowness Measurements

Food product was stored in a plastic container at 25 degrees Celsius. After storage the yellowness was determined. The yellowness is measured with a Digi Eye Digitizer (ex VeriVide Ltd, UK). The Digitizer is calibrated with a Digital color chart checker ser. No. DE00234 date July 2007. The product is measured and gives x, y and z values from which the yellowness index (Yi) can be calculated using the following formula:

$$Yi = 100 * (1.28 * x) - (1.06 * z)/y$$

Higher Yi reflects a more yellow color; lower Yi reflects a more white color.

Ingredients are listed in Table 3

TABLE 3

| (ingredients in wt %) | | | | | |
|---|---|---|---|---|---|
| | 4 | 5 | 6 | 7 | 8 |
| FAT PHASE | | | | | |
| Soybean oil | 27.2 | | | | |
| Hardstock fat | 10.9 | | | | |
| Mono-/diglycerides E471 | 0.2 | | | | |
| Lecithin | 0.2 | | | | |
| Tocopherol mix | 0.02 | | | | |
| Beta-carotene (colorant) | 0.015 | | | | |
| WATER PHASE | | | | | |
| Micronised ferric pyrophosphate | none | 0.084 | 0.28 | 1.68 | 1.68 |
| Zinc oxide | none | 0.230 | 0.096 | 0.015 | 0.231 |
| Tapioca starch | 2.8 | | | | |
| Salt | 0.6 | | | | |
| Sorbic acid | 0.12 | | | | |
| Water (balance) | | | | | |

Hardstock Fat:

Interesterified mixture of 70% dry fractionated palm oil, 10% palm oil, and 20% coconut fat.

Examples 4 to 8 use the same base mix as example 4 and only differ in the amount of micronised ferric pyrophosphate and zinc oxide.

The yellowness was measured after 1 and after 5 weeks of storage at 25 degrees Celsius (Table 4).

TABLE 4

| | yellowness measurements (Yi) | | | | |
|---|---|---|---|---|---|
| | 4 | 5 | 6 | 7 | 8 |
| 1 week | 67.9 | 61.9 | 64.6 | 57.8 | 65.7 |
| 5 weeks | 72.8 | 65.5 | 68.8 | 55.9 | 66.1 |

As can be seen from the examples product with iron and zinc has a lower Yi value, indicating a less yellow color. Also products with iron and zinc were found to show less off taste (i.e. less of a metallic taste) than would be expected for products comprising iron, iron being known to impart a metallic off taste to products.

The invention claimed is:

1. Edible emulsion comprising an aqueous phase and 5 to 85 wt % fat and between 0.003 wt % and 0.7 wt % of iron and between 0.002 wt % and 0.3 wt % of zinc, wherein the emulsion is fat continuous and has a dispersed aqueous phase, the droplet size distribution D3,3 of the dispersed aqueous phase being less than 20 μm.

2. Edible emulsion according to claim 1 wherein the amount of iron is from 0.02 wt % to 0.35 wt %.

3. Edible emulsion according to claim 1 wherein amount of zinc is from 0.02 wt % to 0.15 wt %.

4. Edible emulsion according to claim 1 wherein the amount of fat is between 20 and 70 wt %.

5. Edible emulsion according to claim 1 wherein the amount of fat is from 25 to 60 wt.

6. Edible emulsion according to claim 1 wherein the amount of eicosapentaenoic and/or docosahexaenoic acid fatty acids is 0.5 to 25 wt % on fat level.

7. Edible emulsion according to claim 1 wherein no protein is present.

8. Edible emulsion according to claim 1 wherein the amount of fat is 30-40 wt %.

9. Edible emulsion according to claim 1 wherein the droplet size distribution D3, 3 of the dispersed aqueous phase is less than 8 μm.

10. Edible emulsion according to claim 1 wherein the droplet size distribution D3, 3 of the dispersed aqueous phase is less than 4 μm.

* * * * *